Oct. 10, 1950   G. H. HOSKINSON   2,524,798
OIL TEMPERATURE CONTROL SYSTEM FOR ENGINES
Filed Dec. 5, 1946   2 Sheets-Sheet 1
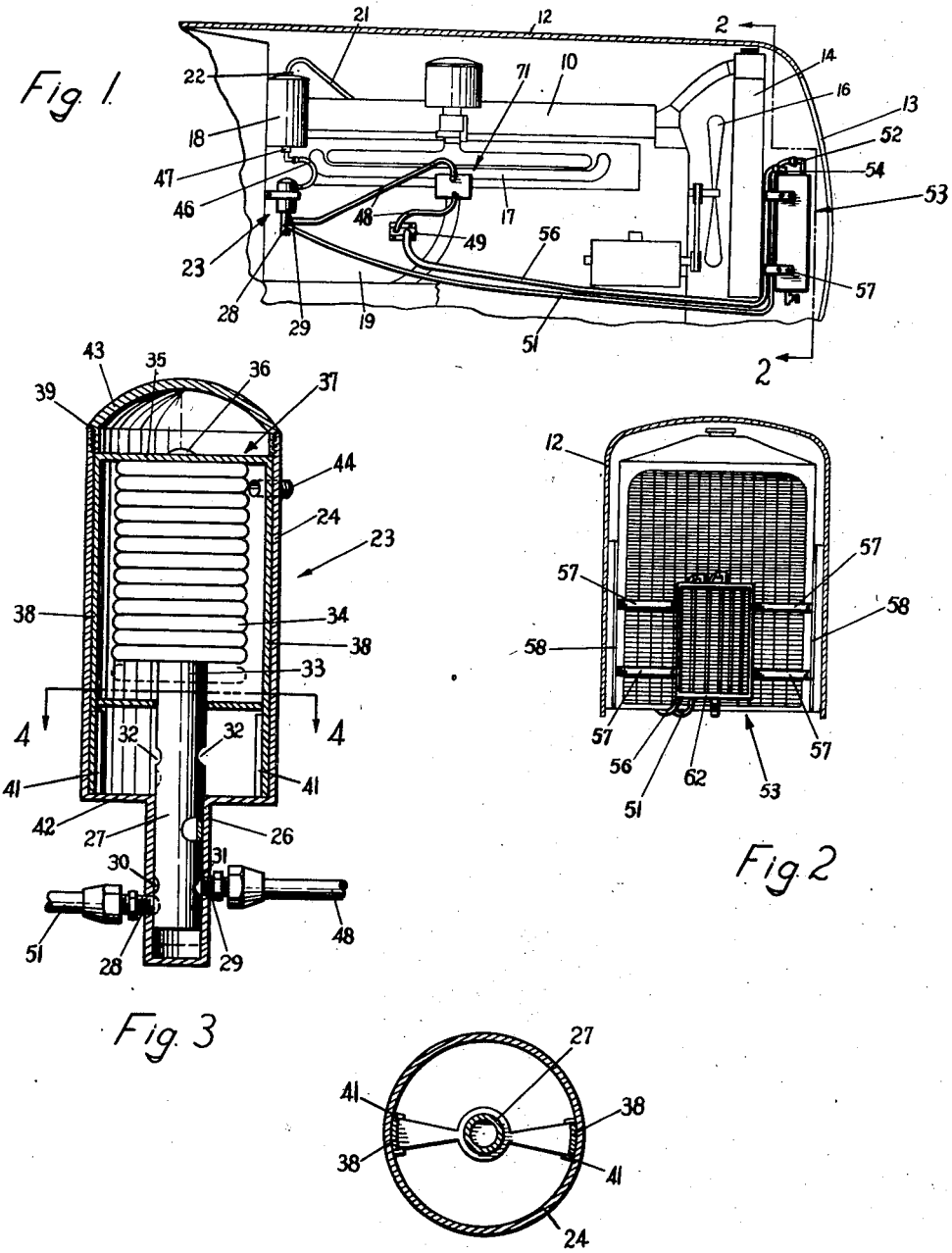
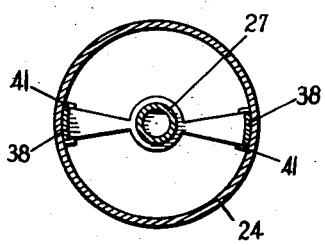
INVENTOR.
GORDON H. HOSKINSON
BY
Atty.

Oct. 10, 1950  G. H. HOSKINSON  2,524,798
OIL TEMPERATURE CONTROL SYSTEM FOR ENGINES
Filed Dec. 5, 1946  2 Sheets-Sheet 2
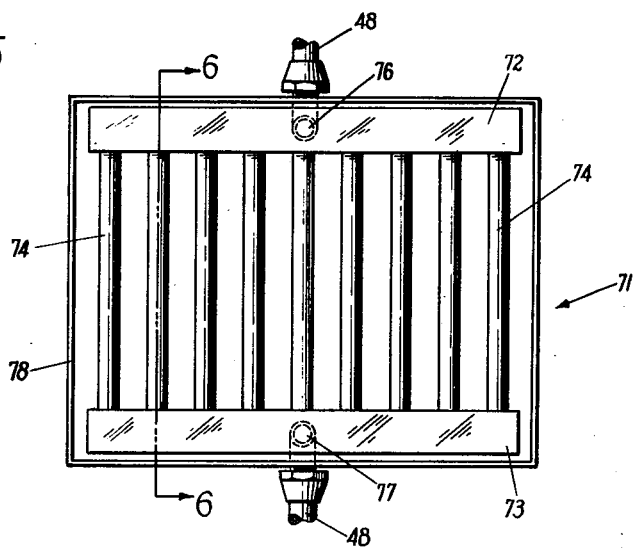
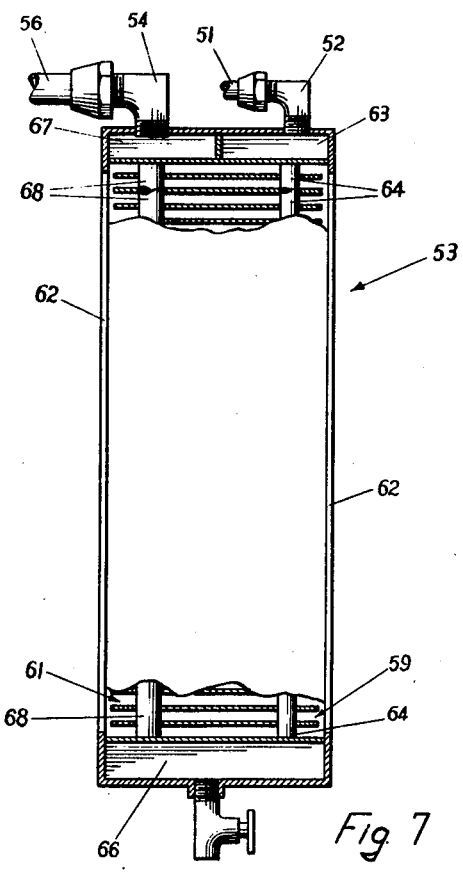
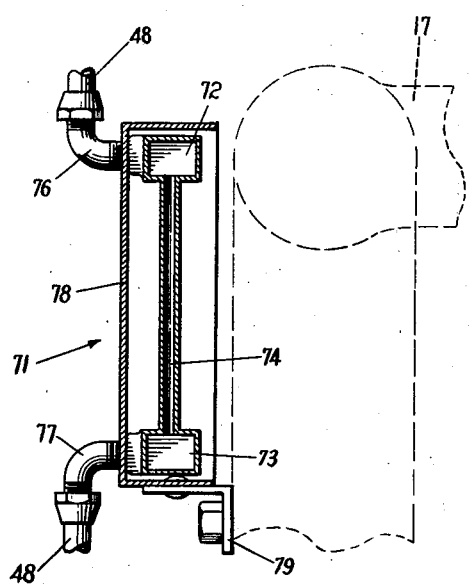
INVENTOR.
GORDON H. HOSKINSON
BY
Atty.

Patented Oct. 10, 1950

2,524,798

UNITED STATES PATENT OFFICE 2,524,798

OIL TEMPERATURE CONTROL SYSTEM FOR ENGINES

Gordon H. Hoskinson, Memphis, Mo., assignor to Continental Thermotrol, Incorporated, Kahoka, Mo., a corporation of Missouri Application December 5, 1946, Serial No. 714,293

4 Claims. (Cl. 123—196)

This invention relates generally to oil viscosity control systems for engines, and in particular to an oil temperature control system for vehicle engines.

Most engines in automobiles and trucks now in general use are without any system for controlling the temperature of the oil supplied to their crankcases or oil reservoirs for later distribution to their lubricating systems. As a result the temperature of the oil for lubricating purposes is dependent primarily upon weather conditions and engine load conditions. Thus in winter the oil temperature may be lower, and in the summer higher, than an optimum temperature for efficiently lubricating the engine. When the oil temperatures run too high for even a short period of time, there is a tendency of the oil to break down so that it loses its lubricating qualities. Further, automobile engines are generally designed to give their best performance at certain oil pressures in their lubricating systems so that this performance is impaired when the oil is not maintained at a proper pressure.

It is an object of this invention, therefore, to provide an improved oil temperature control system for an automobile engine.

A further object of this invention is to provide an oil temperature control system for an automobile engine which is completely automatic in operation to maintain the oil to be distributed to the engine lubricating system at a substantially constant predetermined temperature.

Still another object of this invention is to provide an oil temperature control system for vehicle engines which is easily and quickly applied to different model automobiles, trucks and tractors.

Yet a further object of this invention is to provide an oil temperature control system for a vehicle engine which is of a compact construction so as to occupy a minimum of space on the engine, and capable of being assembled on the engine without interfering with accessibility to the engine for service and maintenance purposes.

A feature of this invention is found in the provision of an oil temperature control system, for a vehicle engine having a water-cooling radiator, which includes an oil-cooling radiator carried forwardly of the water-cooling radiator. A valve unit, formed with an inlet, for receiving oil from the engine lubricating system, and a pair of outlets, has one of the outlets connected with the engine crankcase, and the other outlet connected with an inlet for the oil-cooling radiator, which has an outlet connected with the crankcase. The valve unit includes a thermally actuated valve member for controlling the flow of oil through the pair of outlets in response to the temperature of the oil admitted thereto from the engine lubricating system.

Another feature of this invention is found in the provision of an oil temperature control system in which a valve unit is provided with an inlet and a pair of outlets. A thermally actuated valve member common to such outlets is movable relative to the outlets to control the flow of oil therethrough in response to the temperature of the oil supplied to the valve unit inlet.

Further objects, features and advantages of this invention will become apparent from the following description when taken in connection with the accompanying drawings, in which:

Fig. 1 is a fragmentary side elevational view of the front portion of an automobile, with parts broken away, showing the oil control system of this invention in assembly relation with an automobile engine;

Fig. 2 is a sectional view taken along the line 2—2 in Fig. 1 with the automobile radiator grill removed;

Fig. 3 is an enlarged longitudinal sectional view of a valve unit forming part of the oil temperature control system;

Fig. 4 is a sectional view on the line 4—4 in Fig. 3;

Fig. 5 is an enlarged side elevational detail view of a heat exchange unit forming part of the oil temperature control system;

Fig. 6 is a sectional view taken on the line 6—6 in Fig. 5; and Fig. 7 is an enlarged side elevational view of an oil-cooling radiator with parts broken away to more clearly show its construction.

With reference to the drawings the oil temperature control system of this invention is illustrated in Fig. 1 as applied to the engine 10 of an automobile having a hood 12 and a radiator grill 13. The engine 10 is shown as having a water-cooling radiator 14 provided with a fan 16, an exhaust manifold 17, an oil filter 18 and a crankcase 19. An oil pump (not shown) operates in a generally well-known manner to pump oil from the crankcase 19, to the various lines or tubes of the engine lubricating system, and through an outlet portion 21 of the lubricating system to an inlet 22 on the filter 18.

The oil temperature control system includes a valve unit, indicated generally as 23 (Figs. 1 and 3), having a housing formed with a main cylindrical section 24 open at its top end and integrally formed on its bottom end with a downwardly projected reduced tubular section 26 which is closed at its bottom end and constitutes a sleeve bearing for slidably supporting the lower portion of a tubular valve member 27. The upper portion of the valve member 27 projects upwardly into the housing section 24. The sleeve bearing or tube 26 has a pair of longitudinally offset outlet connections 28 and 29 oppositely arranged from each other such that the lower edge of the upper connection 29 is substantially in the plane of the upper edge of the lower connection.

Openings 30 and 31 are formed in the lower portion of the tubular member 27 at positions directly opposite each other and corresponding to the outlet connections 28 and 29, respectively, in the sleeve bearing 26. The connections 28 and 29 and openings 30 and 31 are relatively arranged such that when the connection 29 and opening 31 are in complete registry the connection 28 and opening 30 are closed from each other. Likewise when the connection 28 and opening 30 are in complete registry, the connection 29 and opening 31 are closed from each other.

Between these positions of complete registry of associated outlet connections 28 and 29 and openings 30 and 31 partial registration takes place between the corresponding outlet connections and openings. The upper end portion of the tubular valve member 27 is formed with a pair of oppositively arranged inlet openings 32 which are open at all times to the space within the housing section 24 for all moved positions of the valve member.

The top end 33 of the valve member 27 is suitably connected to the bottom side of an expansible and contractible bellows member 34 of a well-known type, which expands and contracts in reponse to temperature changes in its surrounding fluid. The upper end of the bellows member is secured, as indicated at 36 to the underside of a crosspiece 35 which constitutes the base portion of an inverted U-shaped supporting bracket, designated as 37 for the bellows member 34 and the valve member 27. As best appears in Fig. 4 the legs 38 of the bracket 37 are of a curvature in transverse section corresponding to the curvature of the housing section 24 and are adapted to be inserted within the open top end 39 of the section 24 in slidable bearing engagement within the housing section.

The lower ends of the legs 38 (Fig. 3), are receivable within guideways 41 integrally formed within the housing section 24 and capable of holding the bracket 37, and in turn the bellows member 34 and valve member 27, against rotational movement relative to the housing section 24. The bracket 37 is maintained against axial movement relative to the housing section 24 by the engagement of the free ends of the legs 38 with the bottom wall 42 of the housing section 24 and the engagement of the crosspiece or base member 35 with a cap member 43 threadable within the open end 39 of the housing section 24 and adapted to fluid seal the same.

An inlet connection 44 is mounted on the housing section 24 at a position spaced from the bracket legs 38 and below the crosspiece 35. This inlet is connected through a pipe 46 (Fig. 1), with an outlet 47 for the oil filter 18. It is seen, therefore, that oil from the filter 18 enters the valve unit 23 at the inlet 44 and after passing around the bellows member 34 travels through the valve member inlet openings 32 for travel outwardly of the valve unit through the connection 28 and opening 30 and/or the connection 29 and opening 31.

The upper outlet connection 29 in the bearing sleeve 26 is connected by a pipe 48 with an inlet 49 to the crankcase 19 (Fig. 1). The lower outlet connection 28 on the bearing sleeve is connected through a pipe 51 with an inlet connection 52 of an oil-cooling radiator 53. An outlet connection 54, on the oil cooling radiator is connected by a pipeline 56 with the crankcase inlet 49. The radiator 53 is mounted on the automobile between the water cooling radiator 14 and the radiator grill 13 so as to be arranged forwardly of the water cooling radiator 14. The oil cooling radiator 53 is supported in this position by mounting brackets 57 (Figs. 1 and 2) connected between the oil cooling radiator and frame member supports 58 for the engine hood 12.

The oil cooling radiator 53 (Fig. 7) is of a type comprised of two heat exchange sections 59 and 61 which are carried in a common open type rectangularly shaped frame 62. The sections 59 and 61 are arranged opposite each other and in assembly on the automobile. The section 59, which carries the radiator inlet 52, is located forwardly of the section 61 which carries the outlet connection 54.

An inlet header 63, arranged at the upper end of the forward section 59, is common to a plurality of upright oil carrying tubes 64, the lower ends of which are connected to a bottom connecting header 66 common to both sections 59 and 61. The rear section 61 has an outlet header 67 and a plurality of upright tubes 68 connected between such header and the connecting header 66. The inlet connection 52 and the outlet connection 54 are mounted on the inlet header 63 and outlet header 67 of the radiator sections 59 and 61, respectively.

In the operation of the oil temperature control system of this invention the value unit 23 is designed to provide for an oil flow through the outlet connection 28 when the temperature of the oil entering the unit inlet 44 reaches a predetermined temperature, it being understood that the outlet connection 29 is in registration with the outlet opening 31 in the valve member 27 when the bellows member 34 is in a contracted position and the temperature of the oil is below such predetermined temperature.

Thus, for example, the engines in present model Ford automobiles will perform best when the oil pressure in its lubricating system is about fifty pounds per square inch. This oil pressure is maintained so long as the temperature of the oil is in the neighborhood of about 155° Fahrenheit. In this case the bellows member 34 is designed to remain in a contracted position so long as the temperature of the oil entering the unit 23 is below 155° Fahrenheit.

When the oil temperature increases above 155° Fahrenheit, the bellows member expands whereby the valve member 27 is moved downwardly within the sleeve bearing 26 so that the outlet opening 31 is moved into partial registration with the outlet connection 29 concurrently with a movement of the outlet 30 into partial registration with the outlet connection 28. A portion of the oil being returned to the crankcase 19 thus travels through the outlet connection 29 and pipe 48 directly into the crankcase, without being cooled, while a second portion of the oil travels through the outlet connection 28 and pipe 51 through the oil cooling radiator 53 and then through the pipe 56 to the crankcase 19.

In the event this bypassing of a portion of the oil through the oil-cooling radiator 53 is insufficient to lower the temperature of the oil entering the unit 23 to 155° Fahrenheit, the bellows member 34 will continue to expand whereby to increase the amount of oil flowing through the outlet connection 28 concurrently with a decrease of the amount of oil flowing through the outlet connection 29, to a maximum moved position at which the openings 30 and 31 in the valve member 27 are in their dotted line positions illustrated in Fig. 3. At these positions of the openings 30 and 31 the flow of oil through the outlet connection 29 directly to the crankcase 19 is completely shut off, and the complete supply of oil to the unit 23 is directed through the oil-cooling radiator 53.

It is contemplated, that the oil radiator 53 be of a size and capacity such that when all of the oil from the unit 23 is traveling therethrough, that such oil will be cooled to a temperature providing for the temperature of the oil at the valve unit inlet 44 of less than 155° Fahrenheit.

In order to maintain the pressure of the oil within the oil-cooling radiator 53 at a minimum value it is contemplated further that the inlet connection 52 be of a diameter of about one-quarter of an inch and the outlet connection 54 of a diameter of about three-eighths of an inch. In other words, the hot oil entering the inlet 52 is of a lower viscosity than the cool oil flowing outwardly from the outlet connection 54.

In actual use it was found that a Ford engine, without the oil temperature control system of this invention, and driven at a fast speed or under load, such as climbing a steep grade, had the oil pressure in the engine lubricating system thereof drop down to about twenty or twenty-five pounds per square inch. This decrease in pressure was due to the fact that the heating of the oil above a temperature of about 155° Fahrenheit, provided for a decrease in the viscosity of the oil. By virtue of this lowering of the viscosity of the oil, the oil is more readily pounded out of the main bearings, and also fails to provide for a proper lubrication of the cylinder pistons and valves.

Under substantially the same operating conditions, and with the engine equipped with the oil temperature control system of this invention, to maintain the temperature of the oil at about 155° Fahrenheit, a substantially constant pressure of about fifty pounds per square inch was maintained at all times.

To facilitate the heating of the oil in the lubricating system of the engine under cold weather conditions there is provided a heat exchange unit, indicated generally as 71 (Figs. 1, 5 and 6), which is connected in the pipeline 48 at a position in a heat exchange relation with the exhaust manifold 17. The heat exchange unit 71 is of a usual type having an inlet header 72 and an outlet header 73 connected together by a plurality of tubes 74. Suitable pipe connections 76 and 77 are mounted on the headers 72 and 73, respectively. The tubes 74 and headers 72 and 73 are enclosed by a reflector or heat-collecting housing 78 which is open at one side, arranged opposite from the manifold 17. Any suitable means, such as shown at 79 in Fig. 6, may be used to support the heat exchange unit 71 adjacent to the exhaust manifold 17, but in actual practice it has been found that the tube 75 48 is of sufficient rigidity to support the heat exchange unit 71 without the provision of any separate mounting means.

It is seen, therefore, that when the engine is started under cold weather conditions, that the oil from the outlet connection 29 flows through the heat exchange unit 71, and is heated therein, prior to its flow into the crankcase 19. As a result the oil is more quickly brought to a desired operating temperature, and with this temperature being maintained by the valve unit 23 in the manner fully described above.

Because of the relatively rapid or quick turn-over of the oil in the crankcase 19 the heat exchange unit 71 may be maintained in the system for operation under warm weather conditions by virtue of the cooling capacity of the oil-cooling radiator 53 and the substantially instantaneous action of the valve unit 23 to control the flow of oil through the outlet connections 28 and 29 in response to oil temperature changes.

From a consideration of the above description it is seen that the invention provides an oil temperature control system for an automobile engine, which is of a compact construction and capable of being readily applied to an engine with a minimum of time and effort. The various parts of the system are capable of being mounted about the engine at places that do not in any way interfere with accessibility to the engine for maintenance and service purposes. Also, by locating the oil-cooling radiator 53 forwardly of the water-cooling radiator 14, the fan 16 is utilized for drawing cooling air therethrough, and through the radiator 14, without effecting any appreciable change in the cooling efficiency of the engine water system. The system is completely automatic in operation by virtue of the thermally actuated valve unit 23, and is capable of operating under all weather conditions, without requiring any changes therein, to accelerate the heating of the oil to an optimum of temperature, and then to maintain such optimum temperature under all engine load conditions. The bellows member 34 and valve member 27 are the only movable parts in the complete system to insure its operation over a long period of time with a minimum of servicing attention.

Although the invention has been described with respect to a preferred embodiment thereof, it is to be understood that it is not to be so limited since changes and modifications in the construction and arrangement of its parts can be made therein which are within the full intended scope of this invention as defined by the appended claims.

I claim:

1. In combination with an engine having a crankcase, an oil filter and an exhaust conduit, an oil temperature control system including a valve unit having an inlet and a pair of outlets, an outlet for said oil filter connected with said valve unit inlet, an oil cooler having an inlet and an outlet, means fluid connecting said oil cooler outlet with said crankcase, other means fluid connecting one of said valve unit outlets with said crankcase including a portion arranged in a heat exchange relation with said exhaust conduit, pipe means connected between the other of said valve unit outlets and said oil cooler inlet, and a thermally actuated valve member in said valve unit for selectively controlling the flow of oil through said pair of outlets in response to the temperature of the oil entering the valve unit from said oil filter.

2. In combination with an engine having an oil filter, a crank case, an air-cooled water radiator, and an exhaust manifold, an oil temperature control system including a valve unit having an inlet and a pair of outlets, a first tube connection between said filter and said inlet, a second tube connection between one of said outlets and said crank case, an oil heater connected in said second tube connection, means supporting said oil heater in a heat exchange relation with said exhaust manifold, an oil cooler having an outlet connected with said crank case, an inlet for said oil cooler connected with the second one of said pair of outlets, means for mounting said oil cooler adjacent to said radiator so as to be cooled by the air flow through said radiator, and a thermally actuated valve member in said valve unit for selectively controlling the flow of oil through said pair of outlets in response to the temperature of the oil entering said valve unit.

3. In combination with an engine having a lubricant distributing system, a crankcase, and an exhaust conduit, an oil temperature control system including a valve unit having an inlet and a pair of outlets, an outlet from said system connected with said valve unit inlet, an oil cooler having an inlet and an outlet, means fluid connecting said oil cooler outlet with said crankcase, other means fluid connecting one of said valve unit outlets with said crankcase including a portion arranged in a heat exchange relation with said exhaust conduit, pipe means connected between the other of said valve unit outlets and said oil cooler inlet, and a thermally actuated valve member in said valve unit for selectively controlling the flow of oil through said pair of outlets in response to the temperature of the oil entering the valve unit from the lubricant distributing system.

4. In combination with an engine having a lubricant distributing system, a crank case, an air-cooled water radiator, and an exhaust manifold, an oil temperature control system including a valve unit having an inlet and a pair of outlets, a first tube connection between said system and said inlet, a second tube connection between one of said outlets and said crank case, an oil heater connected in said second tube connection, means supporting said oil heater in a heat exchange relation with said exhaust manifold, an oil cooler having an outlet connected with said crank case, an inlet for said oil cooler connected with the second one of said pair of outlets, means for mounting said oil cooler adjacent to said radiator so as to be cooled by the air flow through said radiator, and a thermally actuated valve member in said valve unit for selectively controlling the flow of oil through said pair of outlets in response to the temperature of the oil entering said valve unit.

GORDON H. HOSKINSON.

REFERENCES CITED

The following references are of record in the file of this patent:

UNITED STATES PATENTS

| Number | Name | Date |
|---|---|---|
| 1,096,550 | Maranville | May 12, 1914 |
| 1,857,652 | McKinley | May 10, 1932 |
| 1,902,970 | Ramsaur | Mar. 28, 1933 |
| 1,913,680 | McCray | June 13, 1933 |
| 1,925,686 | Chism | Sept. 5, 1933 |
| 1,931,935 | Paugh | Oct. 24, 1933 |
| 2,374,639 | Miller | Apr. 24, 1945 |
| 2,408,265 | Miller | Sept. 24, 1946 |
| 2,440,883 | Wiegman | May 4, 1948 |

FOREIGN PATENTS

| Number | Country | Date |
|---|---|---|
| 232,309 | Great Britain | Apr. 14, 1925 |